US008325920B2

(12) United States Patent
Rassool et al.

(10) Patent No.: US 8,325,920 B2
(45) Date of Patent: Dec. 4, 2012

(54) ENABLING TRANSFERABLE ENTITLEMENTS BETWEEN NETWORKED DEVICES

(75) Inventors: Reza P. Rassool, Stevenson Ranch, CA (US); Glenn A. Morten, Bellevue, WA (US)

(73) Assignee: Google Inc., Mountain View, CA (US)

( * ) Notice: Subject to any disclaimer, the term of this patent is extended or adjusted under 35 U.S.C. 154(b) by 897 days.

(21) Appl. No.: 11/735,847

(22) Filed: Apr. 16, 2007

(65) Prior Publication Data

US 2007/0250912 A1 Oct. 25, 2007

Related U.S. Application Data

(60) Provisional application No. 60/793,366, filed on Apr. 20, 2006.

(51) Int. Cl.
*H04L 29/06* (2006.01)
(52) U.S. Cl. .............................. 380/239; 726/17; 705/44
(58) Field of Classification Search .................... 726/17; 705/44
See application file for complete search history.

(56) References Cited

U.S. PATENT DOCUMENTS

| 4,535,355 | A | 8/1985 | Arn et al. | |
|---|---|---|---|---|
| 5,870,474 | A | 2/1999 | Wasilewski et al. | |
| 5,991,399 | A | 11/1999 | Graunke et al. | |
| 6,415,031 | B1 | 7/2002 | Colligan et al. | |
| 7,120,250 | B2 * | 10/2006 | Candelore | 380/200 |
| 2002/0001385 | A1 | 1/2002 | Kawada et al. | |
| 2002/0015498 | A1 | 2/2002 | Houlberg et al. | |
| 2002/0021805 | A1 | 2/2002 | Schumann et al. | |
| 2002/0089410 | A1 | 7/2002 | Janiak et al. | |
| 2002/0094084 | A1 * | 7/2002 | Wasilewski et al. | 380/241 |
| 2002/0104004 | A1 | 8/2002 | Couillard | |
| 2002/0141582 | A1 | 10/2002 | Kocher et al. | |
| 2005/0004875 | A1 * | 1/2005 | Kontio et al. | 705/52 |
| 2006/0059342 | A1 * | 3/2006 | Medvinsky et al. | 713/168 |
| 2006/0143134 | A1 * | 6/2006 | So et al. | 705/59 |
| 2006/0225138 | A1 * | 10/2006 | Toyohara et al. | 726/27 |
| 2007/0011097 | A1 * | 1/2007 | Eckleder | 705/59 |

FOREIGN PATENT DOCUMENTS

| EP | 0886409 A2 | 12/1998 |
|---|---|---|
| WO | WO-01/93212 A2 | 12/2001 |

OTHER PUBLICATIONS

Wu, Tsung-Li et al., Selective Encryption and Watermarking of MPEG Video (Extended Abstract), Feb. 17, 1997, International Conference on Image Science, Systems, and Technology, 10 pgs.

* cited by examiner

*Primary Examiner* — Jason Gee
(74) *Attorney, Agent, or Firm* — Frommer Lawrence & Haug LLP; John W. Branch

(57) ABSTRACT

A method, apparatus, and system are directed towards employing transferable entitlements using EMMs for enabling a purchase of content using a mobile device, and redeeming for access the content using a different network device. An existing billing infrastructure may be used during a purchase transaction to identify the purchasing device. Upon billing authorization, a transferable EMM (XEMM) may be sent to the purchasing device. The purchasing device may then provide the XEMM to another network device. The other network device may send the XEMM to a redeeming service when requesting access to the content. Upon authorization, an EMM with an access key to the content may be sent to the other network device.

10 Claims, 6 Drawing Sheets

| FIELD | TYPE | CONSTRAINT |
|---|---|---|
| EGUID | GUID | Globally unique |
| CGUID | Encrypted GUID | Globally unique |
| ContentName | String | |
| Permit<br>    start<br>    duration<br>    type | <br>datetime<br>UINT64<br>Enum | <br><br><br>Contiguous \| Non-Contiguous |
| ContentLocator | URL | |
| XEtype | Enum | |
| XEflags | Array of Boolean flags | |
| Xaccess key | | |

ENABLING TRANSFERABLE ENTITLEMENTS BETWEEN NETWORKED DEVICES

CROSS-REFERENCE TO RELATED APPLICATIONS

This application claims the benefit of U.S. Provisional Application Ser. No. 60/793,366 filed on Apr. 20, 2006, entitled "Enabling Transferable Entitlements Between Networked Devices," the benefit of the earlier filing date of which is hereby claimed under 35 U.S.C. §119 (e) and further incorporated by reference.

BACKGROUND

The present invention relates generally to digital copy protection, digital rights management, and conditional access, and more particularly but not exclusively to enabling transferable entitlements using Entitlement Management Messages (EMMs) for providing content to different network devices.

Today a consumer can readily purchase an entitlement to content such as a ticket to the opera, a sports event, movie, or the like. Often, the purchased ticket can be redeemed at some later stage and location. Similarly a consumer may purchase an airline ticket and redeem it for an airplane flight. However, there is a difference of transferability between these two ticket transactions. For various reasons, of both pricing and security, airline tickets represent non-transferable entitlements, where only the named recipient of the entitlement may redeem it, whereas movie tickets, or the like, are typically transferable.

Transferability is an attribute of the entitlement granted by an original owner to the recipient. It means that the recipient may be free to resell or transfer title to the entitlement prior to its redemption. It also typically means that the owner or its distributors agree to honor the redemption of the entitlement from whoever presents the entitlement. Thus, in some situations, a transferable entitlement may become an object of trade.

However, in today's realm of content, such as in the Internet Protocol Television (IPTV) domain, or the like, entitlements do not readily support transferability. If a recipient were to purchase an entitlement on one set top box (STB) there presently is no mechanism to enable the transfer of that entitlement to another set top box or other network device for redemption. Transfer of entitlements between devices on the same or different networks may open a wealth of opportunity for consumers and for content providers.

Moreover, IPTV, and the like, may be currently served in discrete networks—so-called 'walled-garden' networks. These networks typically ensure a level of quality of service and security. However the walls often impose a barrier to a market of consumers inside the wall. The broader commercial motivation of this invention therefore includes allowing third-party content providers outside the walls to gain access to this market. Thus, it is with respect to these considerations and others that the present invention has been made

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
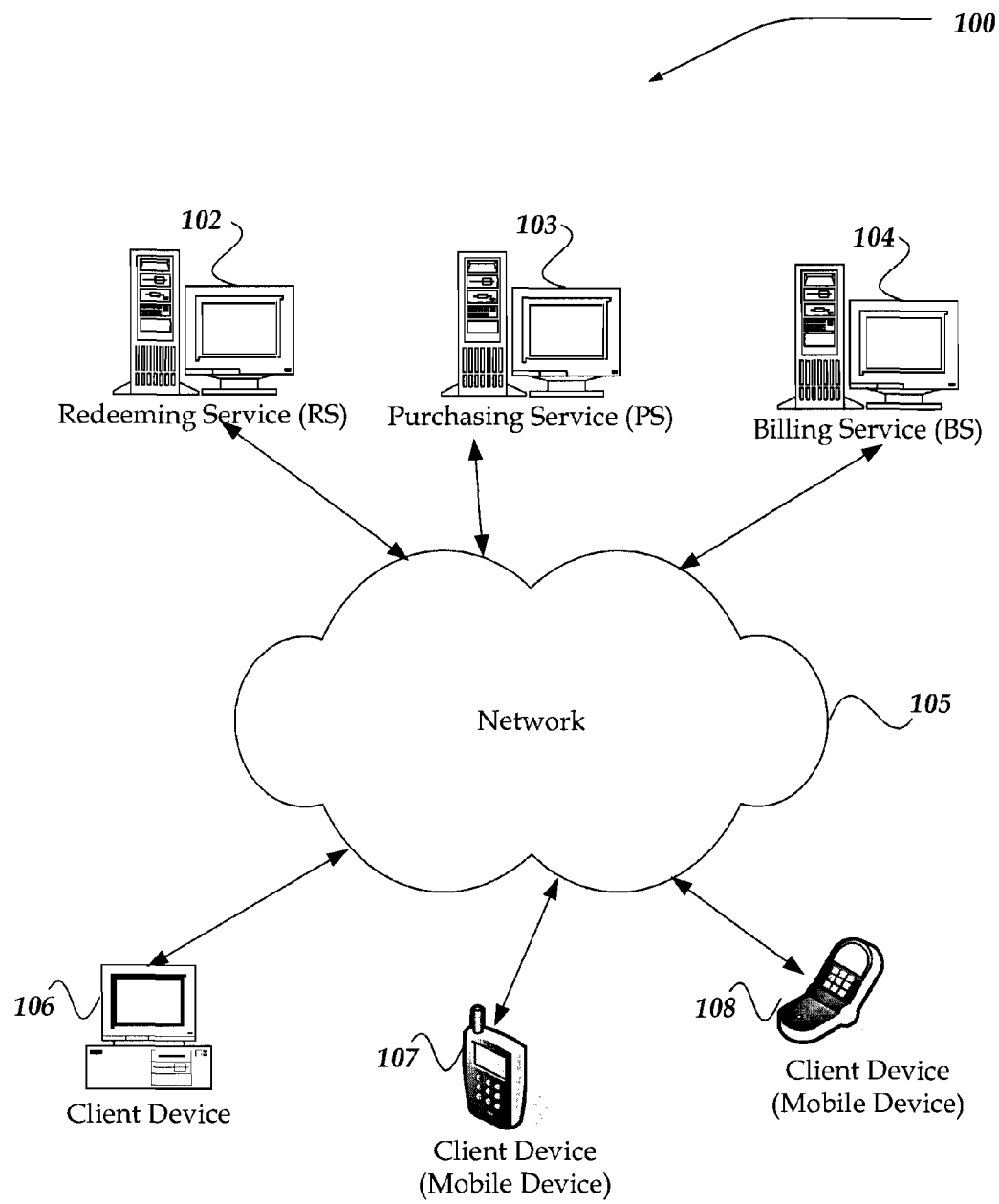
FIG. 1 shows a functional block diagram illustrating an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

"Conditional access" or "digital rights management" refers to a mechanism that enables a provider to restrict access of selected content to selected users. This may be achieved, for example by encrypting the content. One such encryption approach employs a technique that provides a message known as an Entitlement Control Message (ECM). The ECM is typically a packet of data which includes information to determine a control word (CW) for use in decrypting a section of the content. In this approach, streaming or file based content may be encrypted using several CWs. Each CW may be encrypted with an access key and encapsulated in an ECM message. The encrypted content, including the ECMs may then be provided to a user.

The access key may also be encrypted using an encryption key that may be specific to a user, and sent to the user within a message frame, packet, or the like. For example, the access key may be sent within an Entitlement Management Message (EMM). The EMM may also include additional information such as subscription information associated with a user, entitlement information, or the like.

As used herein, the term "entitlement" refers to a right to access and use content. Typically, an entitlement may include a constraint on when the content may be accessed, how long it may be accessed, how often the content may be accessed, whether the content may be distributed, reproduced, modified, sold, or the like. In some instances, an entitlement may restrict where the content may be accessed as well.

As used herein, the term "content" includes, but is not limited to motion pictures, movies, videos, music, PPV, VoD, interactive media, audios, still images, text, graphics, scripts, applications, and other forms of digital content useable by a computing device. However, content is not limited to these examples, and virtually any content may be included, without departing from the scope or spirit of the invention. In one embodiment, the content is provided as a Moving Pictures Experts Group (MPEG) content stream, such as a transport stream, or the like. However, the invention is not so limited, and other file formats may also be employed, without departing from the scope or spirit of the invention.

Briefly, MPEG is an encoding and compression standard for digital broadcast content. MPEG provides compression support for television quality transmission of video broadcast content. Moreover, MPEG provides for compressed audio, control, and even user broadcast content. One embodiment of MPEG-2 standards is described in ISO/IEC 13818-7 (available at http://www.iso.org), which is hereby incorporated by reference.

MPEG content streams may include Packetized Elementary Streams (PES), which typically include fixed (or variable sized) blocks or frames of an integral number of elementary streams (ES) access units. An ES typically is a basic component of an MPEG content stream, and includes digital control data, digital audio, digital video, and other digital content (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more content streams, possible including independent time bases. Moreover, MPEG frames may include intra-frames (I-frames), forward predicted frames (P-frames), and/or bi-directional predicted frames (B-frames).

Briefly, the present invention is directed towards a method, apparatus, and system for employing transferable entitlements using EMMs for enabling a purchase of content using a network device such as a mobile device, and redeeming for access the content using a different network device. In one embodiment, an existing billing infrastructure associated with the "purchasing" mobile device may be employed to enable management of selected aspects of the purchasing of the content.

When the purchasing mobile device requests a purchase of the content, a transferable EMM (XEMM) may be provided to the mobile device. In one embodiment, a billing infrastructure such as may be associated with traditional mobile phone billing, or the like, may be used to authorize and track billing of the purchase (whether the purchase is immediate or deferred). The XEMM may be sent from the mobile device to another network device using any of a variety of networking mechanisms. When the content is to be accessed by the other network device, the XEMM may be sent to a redeeming service. In one embodiment, the XEMM, or a component within it, may be sent using a redeem entitlement message. The redeeming service may determine whether the other network device is authorized to access the content. The redeeming service may make such determination by providing the XEMM, or a component of the XEMM, to a purchasing service, or the like. In one embodiment, the redeeming service may employ a redeem entitlement message to obtain authorization. If it is determined that the other network device is authorized to access the content, the redeeming service may provide to the other network device an EMM that includes an access key, and potentially other rights or entitlements, to enable the other device to access the content. Alternatively, in another embodiment, the redeeming service may instruct the local conditional access service to which the network device is connected to send the network device the appropriate EMM.

Although the purchasing device is designated as a mobile device, the invention is not so limited, and virtually any computing device that may readily be associated with a billing infrastructure may be employed. For example, purchases may be performed using a desktop computer with a credit card, without departing from the scope or spirit of the invention.

Illustrative Environment

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes redeeming service (RS) 102, purchasing service (PS) 103, billing service (BS) 104, network 105, and client devices 106-108 (where client devices 107-108 are mobile devices). Network 105 is in communication with and enables communication between each of RS 102, PS 103, BS 104, and client devices 106-108.

One embodiment of a client device as a mobile device is described in more detail below in conjunction with FIG. 2. Generally, however, Client devices 106-108 may include virtually any computing device capable of receiving and/or receiving a message over a network, such as network 105, from another computing device. Client devices 106-108 may also include any computing device capable of receiving content employing a variety of mechanisms, including, but not limited to a network, CDs, DVDs, tape, electronic memory devices, or the like. The set of such devices may include devices that typically connect using a wired communications medium such as personal computers, multiprocessor systems, microprocessor-based or programmable consumer electronics, network PCs, or the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or the like. Client devices 107-108 represent computing devices that are portable, and therefore typically communicate over a wireless communications medium.

Client devices 106-108 may also be any device that is capable of connecting using a wired or wireless communication medium such as a PDA, POCKET PC, wearable computer, and any other device that is equipped to communicate over a wired and/or wireless communication medium to receive and play content.

Similarly, some of the client devices, such as client device 106 may employ any of a variety of devices to enjoy such content, including, but not limited to, a computer display system, an audio system, a jukebox, set top box (STB), a television, video display device, or the like.

Client devices 106-108 may receive content as scrambled/ encrypted and employ a conditional access control component to decrypt content, and/or enable access to an entitlement and/or right associated with content. For example, client device 106 may receive content decryption keys, access keys, entitlements and/or rights, or the like. Moreover, client devices 106-108 may employ a smart card, such as a virtual smart card, or the like, to manage access to and decryption of the content.

Client devices 107-108 are typically associated with a wireless billing service that is configured to manage at least some billing for communications performed using the client device. As such, BS 104 is intended to represent one such billing service. BS 104 may receive information associated with a communication transaction from client devices 107- 108, including a purchase made employing the mobile device (client devices 107-108). Moreover, BS 104 may also receive an identifier that uniquely identifies the mobile device associated with the communication. BS 104 may then employ the unique identifier to provide a bill to the user associated with the mobile device. Devices that may operate as BS 104 include personal computers, desktop computers, multiprocessor systems, network PCs, servers, or the like. Moreover, although BS 104 is illustrated as a single computing device, the invention is not so limited. For example, BS 104 may be implemented as a plurality of computing devices.

PS 103 includes virtually any network device that may be configured to manage a request for a purchase of content over a network. Typically, PS 103 may receive a request for a purchase from a mobile device, such as client devices 107- 108. PS 103 may also receive a unique identifier associated with the mobile device. PS 103 may then provide an entitlement to the requesting mobile device based on whether the request is determined to be authentic and authorized. In one embodiment, PS 103 may communicate with BS 104 to determine whether the purchase may be authorized, based in part on a financial amount of the purchase requested, the unique identifier, and the like. Moreover, PS 103 may determine whether the billing is to be immediate or deferred based in part on any prior arrangements between the mobile device user and BS 104, an offering associated with the content being purchased, or the like. In one embodiment, PS 103 may also determine whether the purchase is to include a non-transferable or a transferable entitlement that provides rights and/or constraints on the use of the purchased content.

Devices that may operate as PS 103 include personal computers, desktop computers, multiprocessor systems, network PCs, servers, or the like. Moreover, although PS 103 is illustrated as a single computing device, the invention is not so limited. For example, PS 103 may be implemented as a plurality of computing devices.

One embodiment of RS 102 is described in more detail below in conjunction with FIG. 3. Briefly, however, RS 102 includes virtually any network device that may be configured to manage a request for redemption of an entitlement associated with content. RS 102 may receive from a client device, such as client device 106 a transferable entitlement message that includes a request for access to the content. Access to the content may be obtained through an access key that is configured to decrypt the content. In one embodiment, therefore, if RS 102 determines that the request for access is authorized, RS 102 may provide the access key to the client device through an EMM. However, transfer of the access key is not limited to being provided through an EMM, and other mechanisms may also be used, without departing from the scope or spirit of the invention.

RS 102 may determine whether the request is authorized using a variety of mechanisms. For example, in one embodiment, RS 102 may receive within the transferable entitlement message from the client device, information that may be used to determine authorization. Such information may be provided to PS 103, at least in part, to confirm that the request is authorized, as described in more detail below. In one embodiment, where the purchase was a deferred purchase that includes an instruction to bill the user of the mobile device upon redemption, additional information may also be sent to BS 104 indicating the user is redeeming the entitlement for the content.

Devices that may operate as RS 102 include personal computers, desktop computers, multiprocessor systems, network PCs, servers, or the like. Moreover, although RS 102 is illustrated as a single computing device, the invention is not so limited. For example, RS 102 may be implemented as a plurality of computing devices.

While FIG. 1 illustrates PS 103 and RS 102 as distinct services, it should be noted that they may be operated by one or more distinct entities. For example, PS 103 and RS 102 may be operated by a single ticketing service. Moreover, in one embodiment, PS 103, RS 102, and even BS 104 may be operated by one or more entities, including, for example, a single ticketing service, without departing from the scope or spirit of the invention.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one networked computing device and another.

Moreover, network 105 may represent a plurality of different components, and/or network paths between networked devices. Thus, content and/or other information provided between mobile devices 107-108 and PS 103 may employ at least in part a different network component and/or path than information provided between RS 102 and client device 106, for example. For example, a content provider (not shown), and the like, may provide content to client device 106 over a satellite link, while client device 106 may receive, including ECMs, and/or EMMs over a wired link, a telephone dial-up component, or the like. However, the invention is not so limited, and client device 106 may also employ virtually the same network 105 components, protocols, and/or mechanisms with which to communicate information between RS 102, a content provider, or even between client devices 107-108.

Client device 106 is not limited to receiving content, and/or ECMs, and/or EMMs over network 105, however. For example, content may be provided to client device 106 (or even mobile devices 107-108) using any of a variety of other portable content storage devices, including, but not limited to Digital Versatile Discs (DVDs), High Definition DVD (HD-DVD), Compact Discs (CDs), Video Compact Disc (VCD), Super VCD (SVCD), Super Audio CD (SACD), Dynamic Digital Sound (DDS) content media, Read/Write DVD, CD-Recordable (CD-R), Blu-Ray discs, or the like. Moreover, client devices may receive content using, for example, a portable content storage device, while receiving ECMs and/or, EMMs over network 105, without departing from the scope or spirit of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

In one embodiment, communications between RS 102, PS 103, BS 104, and/or client devices 106-108 may be performed using any of a variety of mechanisms, including, secure communication channels, including, but not limited to SSL/TLS, Point-to-Point Tunneling Protocol (PPTP), Layer 2 Tunneling Protocol (L2TP), Layer 2 Forwarding (L2F), IP SECurity (IPSec) VPNs, SSL VPNs, or the like.

Illustrative Mobile Client Environment

Figure 2:
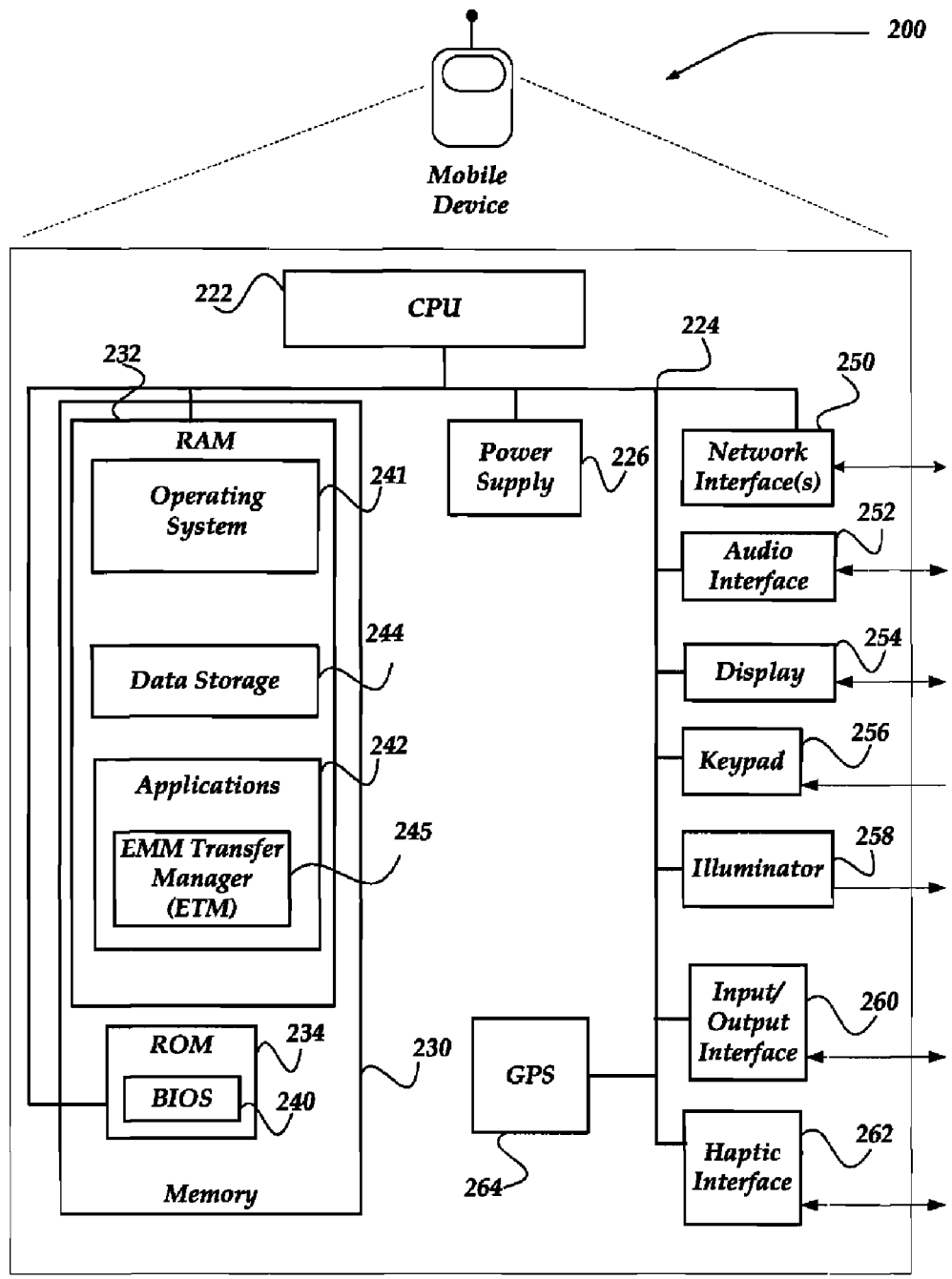
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, client devices such as mobile devices 107-108 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Data storage 244 may also store information that uniquely identifies mobile device 200 including a phone number, a Mobile Identification Number (MIN), an electronic serial number (ESN), Mobile Station International ISDN Number (MSISDN), or other mobile device identifier. Moreover, data storage 244 may also be employed to store entitlements in a variety of formats, including but not limited to an XEMM, EMM, or the like. At least a portion of the stored entitlements, and the like, may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may further include EMM Transfer Manager (ETM) 245.

ETM 245 is configured to manage transferable entitlements through the use of XEMMs. ETM 245 may operate in conjunction with other client applications, such as a browser, a network component, or the like, to enable a mobile user to select and request a purchase of content over a network. In one embodiment, ETM 245, or another component, may provide a unique identifier associated with mobile device 200 useable to manage billing of the purchase. For example, in one embodiment, a phone number, a Mobile Identification Number (MIN), an electronic serial number (ESN), Mobile Station International ISDN Number (MSISDN), or the like, may be automatically transferred during at least a portion of a transaction for the purchase of the content. However, the invention is not limited to employing such unique identifiers. For example, the mobile user may also employ ETM 245, or another client application, to provide a credit card number, unique password/username, or the like, during the purchase transaction.

ETM 245 may then receive an XEMM associated with the purchase, and provide the XEMM to data storage 244. ETM 245, in conjunction possibly with another client application, may further enable the XEMM to be provided to another network device. In one embodiment, ETM 245 may send the XEMM to the other network device over a wireless or wired network. In one embodiment, ETM 245 may send the XEMM to the other network device upon a request from the other network device. In one embodiment, ETM 245 may employ, at least in part, a process such as described below in conjunction with FIG. 5 to perform at least some of its actions.

Illustrative Server Environment

Figure 3:
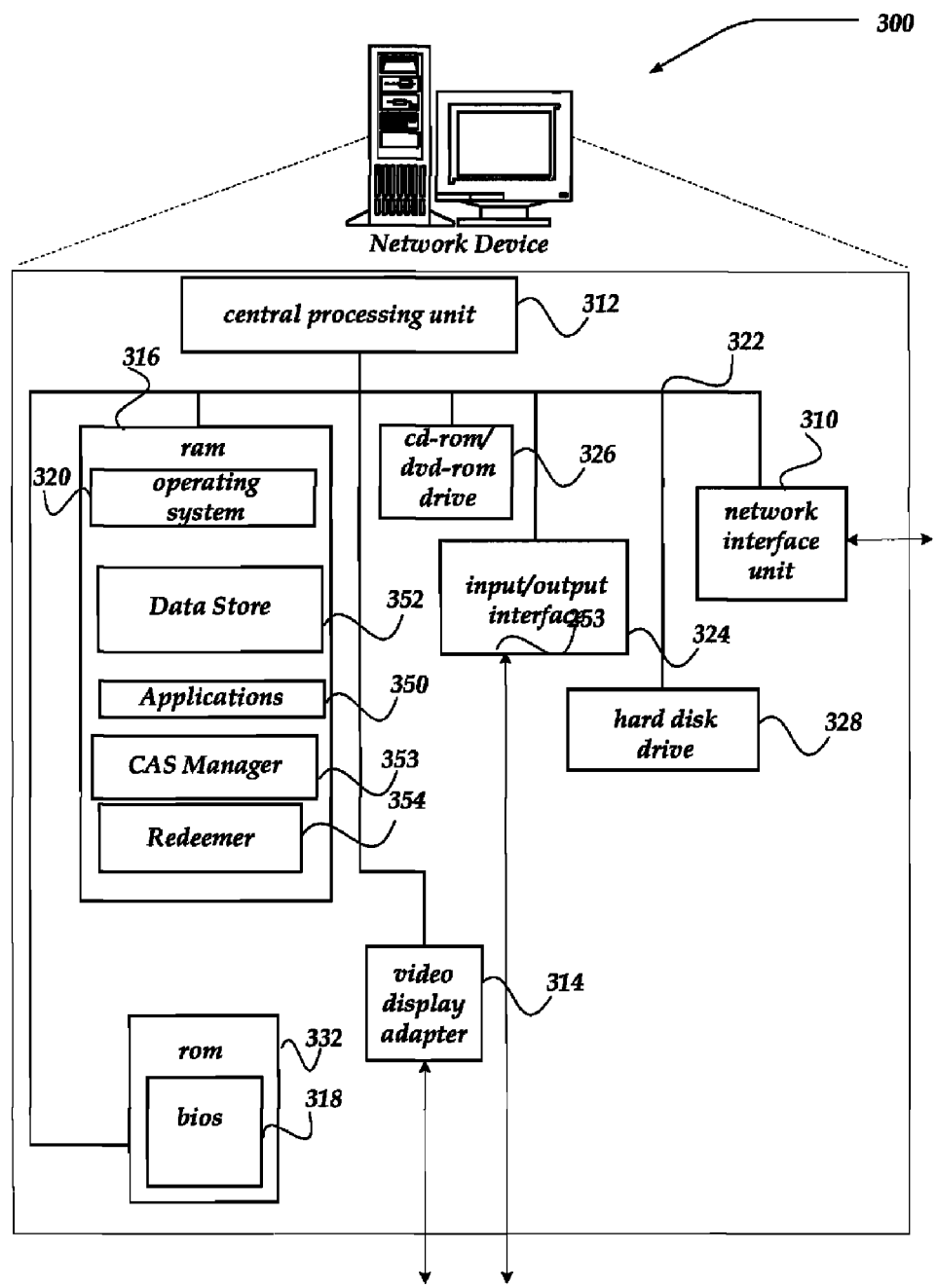
FIG. 3 shows one embodiment of a server device that may be employed as a redeeming service.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, RS 102 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, content delivery programs, account management and so forth. Application programs may also include CAS manager 353 and Redeemer 354.

CAS manager 353 may be configured to scramble/encrypt content using any of a variety of encryption mechanisms to generate encrypted content, including, but not limited to, RSA algorithms, Data Encryption Standard (DES), International Data Encryption Algorithm (IDEA), Skipjack, RC4, Advanced Encryption Standard (AES), Elliptic Curve Cryptography, or the like.

CAS manager 353 may also selectively encrypt at least a portion of the content leaving another portion unencrypted (e.g., in the clear). CAS manager 353 may selectively encrypt one portion of the content using one encryption technique, and another portion of the content using a different encryption technique. CAS manager 353 may further employ different content encryption keys (CWs) for different portions of the selectively encrypted content.

CAS manager 353 may select to encrypt a video elementary stream (ES), an audio ES, a digital data ES, and/or any combination, and/or any portion of video, audio, data elementary streams to generate encrypted content. CAS manager 353 may further select to encrypt at least a portion of an I-frame, P-frame, B-frame, and/or any combination of P, B, and I frames. Moreover CAS manager 353 may perform such encryption on-the-fly.

CAS manager 353 may also place CWs into ECMs, and/or access keys within EMMs. CAS manager 253 may employ MPEG or another mechanism to prepare and provide the content, ECMs, and/or EMMs to a client device.

Redeemer 354 is configured to receive a request for content and to provide an EMM with an access key to decrypt the content. Redeemer 354 may receive the request in the form of a redeem entitlement message, or the like. In one embodiment, the redeem entitlement message may include at least a portion of an XEMM. Redeemer 354 may then employ the portion of the XEMM to determine whether the requester is authorized to access the content. In one embodiment, redeemer 354 may send a redeem entitlement message to another device to determine whether the requester is authorized. For example, in one embodiment, redeemer 354 may send the portion of the XEMM to a purchase service, or the like. If the requester is authorized to access the content, redeemer 354 may authorize an EMM with an access key to the content be provided to the requester. In one embodiment, redeemer 354 may request that CAS manager 353 provide the EMM to the requester. In one embodiment, redeemer 354 may employ at least a portion of a process such as described below in conjunction with FIG. 5 to perform at least some of its actions.

Figure 4:
FIG. 4 shows a logical schema illustrating one embodiment of a transferable EMM (XEMM) for use in practicing the invention.

FIG. 4 shows a logical schema illustrating one embodiment of a transferable EMM (XEMM) for use in practicing the invention. XEMM 400 of FIG. 4 may include many more or less components than those shown. The components shown, however, are sufficient to disclose an illustrative embodiment for practicing the invention.

As shown, XEMM 400 includes entitlement globally unique ID (EGUID) 402, content globally unique ID (CGUID) 404, content locator 406, xaccess key 408, and permits 410.

EGUID 402 includes any of a variety of data that uniquely identifies the entitlement in a global population of entitlements, and is employable to provide authorization during redemption, as well as auditing, billing, and the like. That is, EGUID 402 may identify a source of entitlements, such as purchasing service 103 of FIG. 1, for example. In one embodiment, the unique identifier, EGUID 402 may be digitally signed by the purchasing service, or the like.

CGUID 404 includes any of a variety of data and/or metadata that uniquely identifies content, independent of content source, redemption service, and location of redemption. Thus, for example, CGUID 404 for say a "Super Bowl 2006 game," is independent of which content delivery network, service provider, and the like, that may be employed to access the content. Each service provider may maintain their own mapping from CGUID 404 to the local content ID that refers to "Super Bowl 2006 game" in the example. In one embodiment, an encrypted CGUID 404 may be provided in the XEMM. This may be encrypted with a one time Xaccess key 408 that may be retained, for example, in the database of the purchase service.

Content locator 406 includes data, metadata, or the like that specifies where content may be located over a network. In one embodiment, content locator 406 points to a location of the redemption service. In one embodiment, content locator 406 may include a Uniform Resource Locator (URL). However, the invention is not so limited, and other pointers, IP addresses, device identifiers, service provider identifiers, MAC addresses, or the like, may also be used. In another embodiment, the content locator 406 could be a one time URL that is resolved upon a first redemption of the XEMM.

Xaccess key 408 is a cryptographic key that is employed to redeem the content specified in the entitlement. Xaccess key 408 typically is not the same as an access key useable to decrypt a control word in an ECM in traditional conditional access systems. In one embodiment where the content locator 406 points explicitly to the content with a one-time URL then the Xaccess key 408 could be a key necessary to decrypt the content. In another embodiment the Xaccess key 408 may be retained in a purchase service database and be used to decrypt the encrypted CGUID 404 in the XEMM upon redemption.

Permits 410 may include a variety of data, and/or metadata, useable to indicate when an entitlement is valid. Thus, permits 410 may include start/stop times for when access to the content is valid, a duration time, or the like. Permits 410 may also include other entitlement data, including, but not limited to how often the content may be accessed, how often the content may be played, whether the content may be printed, whether the content may be copied, distributed, modified, or the like.

Generalized Operation

When a content owner releases content to a service operator to be resold to consumers it may choose to allow the item of content to be resold with transferable entitlements. This agreement may be embodied in a 'franchise' record. The franchise record may specify the content, a duration over which the franchise is valid, and terms of the franchise which may include, among other conditions, the transferability of entitlements. In the case of a franchise with transferable entitlement (XEFranchise), the record may also include a ticketing service with which the content is registered.

When new content is added and encrypted on the service operator's network for which a XEFranchise exists, the service operator may register the content at a designated ticketing service. The registration of the content allows the ticket service to know what content is available for purchase and subsequent redemption.

Figure 5:
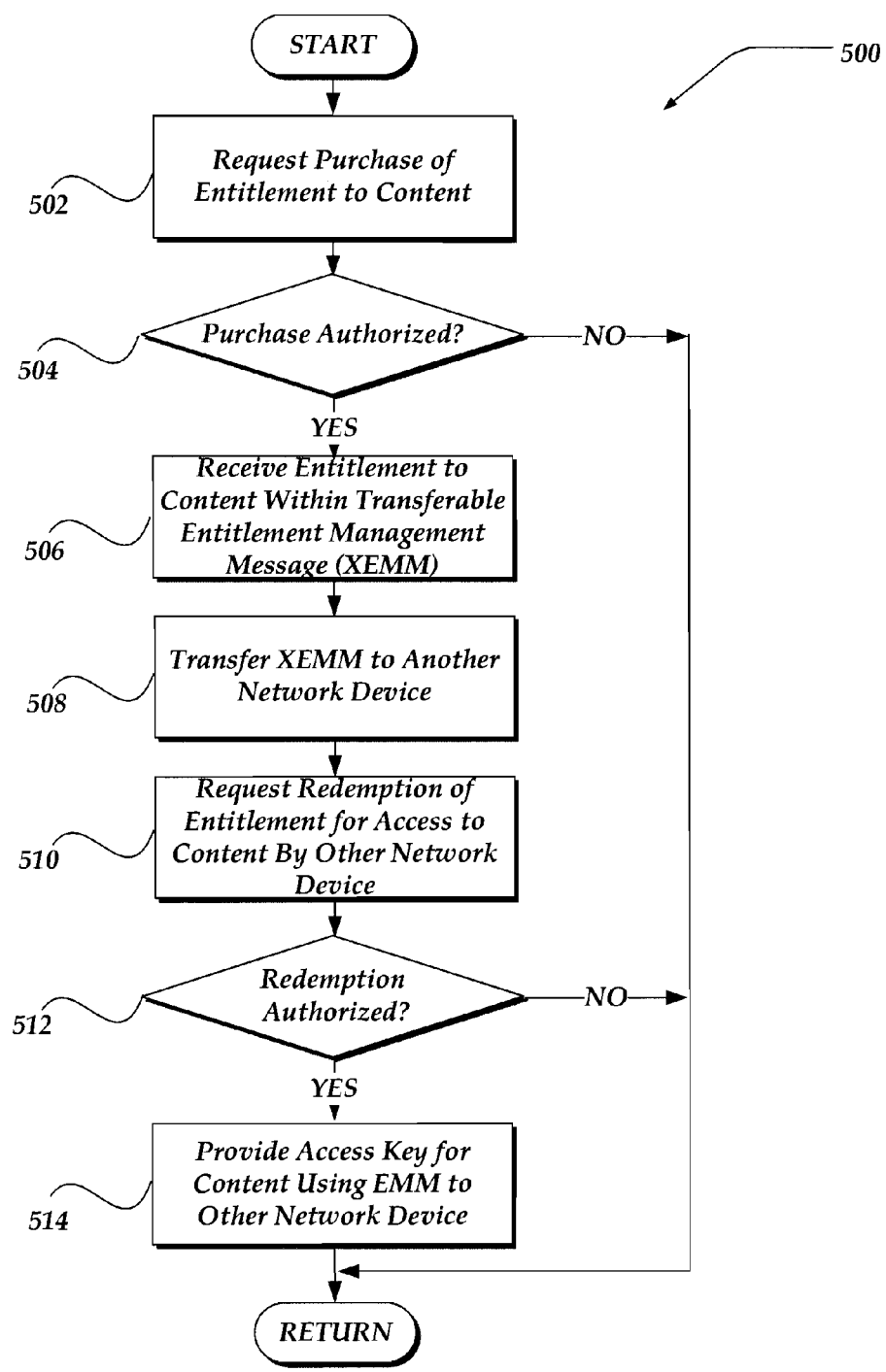
FIG. 5 illustrates a logical flow diagram generally showing one embodiment of an overview of a process for employing a transferable EMM for use in purchasing content through a mobile device and accessing the purchased content through a different network device.

The operation of certain aspects of the invention will now be described with respect to FIG. 5. Process 500 of FIG. 5 may be distributed across several computing devices of FIG. 1. For example, blocks 502, 506 and 508 may be implemented with mobile device 108 of FIG. 1, while block 504 may be implemented within PS 103 of FIG. 1. In addition, blocks 510 may be implemented within one of client devices 106-108 or mobile device 107 of FIG. 1, while blocks 512 and 514 may be implemented within RS 102 of FIG. 1. However, the invention is not constrained to this distribution of actions, and other distributions may be employed.

As shown, process 500 begins, after a start block, at block 502, where a user of a mobile device makes a request to purchase an entitlement to content. In one embodiment, the user may have previously examined the content using the mobile device. In one embodiment, the mobile device may display a browser page, or another display that enables the user to view and/or select content for purchase. In one embodiment, the display may include a title list, an icon menu, or the like. In one embodiment, the display may display a request to purchase inquiry to the user upon examining the content, such as viewing (or listening to) a trailer, viewing (or listening to) a portion of the content, or the like. In any event, the user may select to purchase an entitlement (e.g., a right to access the content) as a non-transferable entitlement, or a transferable entitlement. In one embodiment, a transferable entitlement may be configured as a default purchase configuration. If the user requests a transferable entitlement, processing continues; otherwise, processing may exit (not shown) process 500. In one embodiment, the request for purchase may be performed through a purchasing service such as PS 103 of FIG. 1.

In one embodiment, as at least a portion of the communications associated with the purchase transaction, a unique identifier associated with the mobile device may be sent to the purchasing service. The unique identifier may be one that is commonly associated with billing transactions for the mobile device. In one embodiment, the unique identifier may be automatically and/or transparently (without user intervention) provided to the purchasing service.

Processing proceeds next to decision block 504 where a determination is made whether the purchase is authorized. Several different purchase agreements may be available. For example, in one embodiment, the purchase may be immediate. That is, upon request, the user associated with the mobile device may be billed for a purchase. In another embodiment, the purchase may be considered as a deferred purchase. As a deferred purchase, authority may be provided that enables billing at some future time, such as upon redemption of the entitlement, upon access of the content, upon viewing or otherwise playing the content, or the like.

In either event, if the purchase is authorized under at least one of these schemes, either an immediate or a deferred purchase, processing proceeds to block 506. However, if the purchase request is not authorized for any of a variety of reasons, processing may return to another calling process to perform other actions.

At block 506, however, a transferable entitlement management message (XEMM) may be generated for the requested purchase. The XEMM may then be sent over a network to the mobile device.

Processing then proceeds to block 508 where the XEMM may be transferred over a network to another network device. The XEMM may be transferred over a wireless or wired network. For example, in one embodiment, the user may employ infrared, blue tooth, or other wireless mechanisms to communicate with the other network device. Similarly, the mobile device may be plugged into a wired network that enables communication with the other network device.

The above blocks described one embodiment of a transferable entitlement purchase for content over the network. The following next describe one embodiment of a transferable redemption for the content over the network.

Figure 6:
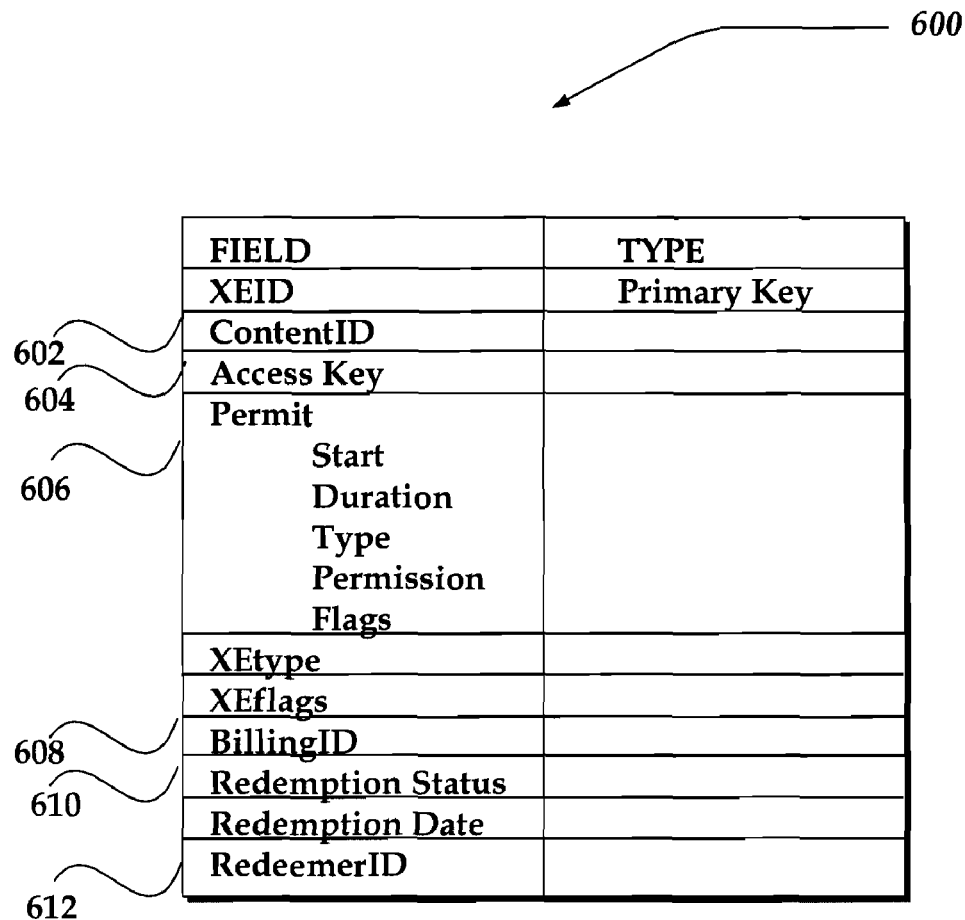
FIG. 6 shows a logical schema illustrating one embodiment of a database structure useable for managing XEMM redemptions, in accordance with the invention.

Processing proceeds next to block 510 where a request to redeem the entitlement is sent over a network. In one embodiment, the request may be sent to a redeeming service, such as RS 102 of FIG. 1, or the like. In one embodiment, the request may be in the form of a redeem entitlement message. In one embodiment, the redeem message may include at least a portion of the XEMM. For example, the redeem message may include an EGUID, a CGUID, a content locator, a xaccess key, or the like, from the XEMM. Additionally the redeem entitlement message may include the identification of the redeeming device and the identification of the service operator in whose network the redeeming device is connected. The redeeming device's identification may be recorded for auditing purposes in the purchasing service's database. The service operator's identification is looked up in the purchasing service's database to find the service operator's address. FIG. 6 shows a logical schema illustrating one embodiment of a database structure useable for managing XEMM redemptions. Briefly, as shown, schema 600 includes a redeemerID 612, a billingID 608, a redemption status 610, permits 606, an access key 604, and contentID 602.

The redeeming service may then send the service operator a fulfill entitlement message. The fulfill entitlement message requests that the service operator issues to the redeeming device the required EMM.

Process 500 continues next to decision block 512, where a determination is made whether the redemption is authorized. In one embodiment, the determination may be made, at least in part by examining a redemption status 610 within a database, to determine whether the redemption has already been performed. If the redemption has not already been performed (or is permitted to occur multiple times), the determination may be made through communications with the purchasing service, billing service, or the like. For example, in one embodiment, another redeem entitlement message is sent to the purchasing service to confirm that the request is authentic, and authorized. In one embodiment, where the EGUID is digitally signed by a Certification Authority (CA), or the like, a request may be made to the CA to authenticate the digital signature for the EGUID. In addition, in one embodiment, at least a portion of the XEMM may be sent in the redeem message. In one embodiment, the redeeming service may forward the redeem message to the purchasing service. If it is determined that the request for redemption is authentic and authorized, the purchasing service may respond by sending to the redeeming service a fulfill entitlement message, or the like. In any event, if the redemption is authorized, processing flows to block 514; otherwise, processing may return to the calling process to perform other actions. For example, in one embodiment, the requesting device may be provided a message indicating that the redemption is not authorized. In one embodiment, the requesting device may be allowed to try another attempt at redemption of the entitlement for the content.

At block 514, the access key or keys that enable decryption of the content may be provided to the requesting device. In one embodiment, the access key is provided to the requesting device within an ECM, EMM, or the like. Process 500 then returns to the calling process to perform other actions.

The description thus far has considered the cases where the entitled content exists on the local storage of the service operator to which the redeeming device is connected. In a further extension to the invention we also consider the case where the content is not immediately available in the network to which the redeeming device is connection. In this case the redeeming service may instead issue a back order message in place of the fulfill entitlement message. The redeeming service may find the location of the content on another service operator's network. The redeeming service may send a request to transfer content from one service operator to another. This transfer may take some time. The back order message may include an expected time of arrival when the fulfillment of the XEMM will be complete.

Additionally the XEMM for an item of content may be sold in advance of its availability on a network. It is common for tickets to be sold prior to the availability of content. The various acts of redemption of XEMMs in diverse networks will help to optimize the delivery of the required content to several networks. Currently content, such as video-on-demand movies, are pushed speculatively to several networks. Through pre-selling XEMMs for content the consumers will in effect pull the content and the distribution will be demand driven.

Moreover, where the transaction involves non-transferable entitlements, a consumer may be allowed to redeem the entitlement on the same device upon which the content was purchased. This means that they might be able to watch a purchased movie, for example, directly on their phone, as some emerging cell phones support a video output spigot. However, for possibly a different charge the movie can be viewed on an external display. Moreover, some phones may support large storage devices (either internal or externally connected). This means that there may be support for both streamed content and downloaded content. Downloaded content can be stored on the large storage device, and so the entertainment content quality may not be limited by a bandwidth of the network connection. Additionally, some phone may support hybrid communication technology. They may include cell phone hardware that supports traditional unicast applications of telephony and may also have digital terrestrial receivers with support for broadcast communication. This means that an entitlement could be purchased using the unicast communication and redeemed using the broadcast reception.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for use in managing access to content over a network, comprising:
a mobile device that is operative to perform actions, including:
providing over the network a request to access content;
receiving a transferable entitlement that includes a right to access and use the requested content prior to registering the requested content at a ticketing service for subsequent access on the network;
receiving a cryptographic key for redeeming the requested content; and
transferring the transferable entitlement over the network to a network device; and
the network device that is operative to perform actions, including:
receiving the transferable entitlement from the mobile device;
providing the transferable entitlement for redemption over the network; and
if the transferable entitlement is determined to be valid, performing further actions, comprising:
receiving an Entitlement Control Message (ECM), wherein an access key that is separate from the cryptographic key is employable for decrypting at least part of the ECM; and
employing the access key to decrypt one or more control words within the ECM for subsequent use in decrypting the content to enable the content to be played by the network device.

2. The system of claim 1, wherein the transferable entitlement further comprises a Entitlement Management Message with extensions, wherein the extensions comprise at least one of an entitlement Identifier, content Identifier, or a content locator.

3. The system of claim 1, further comprising:
the mobile device being operative to perform actions, further including:
automatically providing a unique identifier associated with the mobile device that enables a purchase of the access to the content; and
a billing service that is configured to receive the unique identifier and to employ the unique identifier to bill a user associated with the mobile device for the purchase of the access.

4. The system of claim 1, wherein-receiving the access key further comprises receiving the access key within a non-transferable entitlement management message (EMM).

5. The system of claim 1, wherein the content is selectively encrypted such that at least a portion of the content is encrypted, and another portion of the content is unencrypted.

6. The system of claim 1, wherein the transferable entitlement further comprises a computer-readable storage medium having stored thereon a data structure comprising:
a first data field that is configured and arranged to include an entitlement globally unique identifier that uniquely identifies an entitlement in a defined global population of entitlements and is employable to provide authorization during redemption;
a second data field that is configured and arranged to include an identifier of the content; and
a third data field that is configured and arranged to indicate at least when an entitlement is valid.

7. A network device to managing access to content over a network, comprising:
a transceiver to send and receive data over the network; and
a processor that is operative to perform actions, including:
receiving from a mobile device, a transferable entitlement that includes a right to access and use content that is associated with a request by the mobile device to access content prior to registering the content associated with the request at a ticketing service for subsequent access on the network;
receiving a cryptographic key for redeeming the requested content;

providing the transferable entitlement and a request for redemption to access the content to a redeeming service;
if the transferable entitlement is determined to be valid, performing further actions, comprising:
receiving from the redeeming service an Entitlement Control Message (ECM), wherein an access key that is separate from the cryptographic key is employable: for decrypting at least part of the ECM;
employing the access key to decrypt one or more control words within the ECM for subsequent use in decrypting the content that enables access to the content; and
playing the content by the network device based on the transferable entitlement.

8. The network device of claim 7, wherein the mobile device is configured and arranged to authorize a purchase to access the content prior to providing the transferable entitlement to the network device.

9. The network device of claim 7, wherein providing the request for redemption further comprises providing the request to a redeeming service using a redeem entitlement message that includes at least a portion of the transferable entitlement.

10. The network device of claim 7, wherein determining if the transferable entitlement is valid further comprises examining a redemption status, including examining whether a prior redemption request using the transferable entitlement has been provided.

* * * * *